(12) United States Patent
Finch et al.

(10) Patent No.: US 9,083,537 B2
(45) Date of Patent: \*Jul. 14, 2015

(54) DEVICE AND METHOD FOR ENERGY MANAGEMENT IN A HOUSEHOLD

(75) Inventors: Michael Francis Finch, Louisville, KY (US); David C Bingham, Louisville, KY (US); Henry Nader Kobraei, Louisville, KY (US); Elliott Dean Koehler, Louisville, KY (US)

(73) Assignee: GENERAL ELECTRIC COMPANY, Schenectady, NY (US)

( \* ) Notice: Subject to any disclaimer, the term of this patent is extended or adjusted under 35 U.S.C. 154(b) by 339 days.

This patent is subject to a terminal disclaimer.

(21) Appl. No.: 13/270,296

(22) Filed: Oct. 11, 2011

(65) Prior Publication Data

US 2013/0091567 A1    Apr. 11, 2013

(51) Int. Cl.
*G06F 12/14* (2006.01)
*H04L 12/10* (2006.01)
*G06F 21/85* (2013.01)
*H04W 12/04* (2009.01)
*H04W 12/06* (2009.01)
*H04L 12/28* (2006.01)

(52) U.S. Cl.
CPC .............. *H04L 12/10* (2013.01); *G06F 21/85* (2013.01); *H04L 12/2816* (2013.01); *H04W 12/04* (2013.01); *H04W 12/06* (2013.01); *H04L 2012/2841* (2013.01)

(58) Field of Classification Search
CPC .... G06Q 20/32; H04L 63/0428; H04L 63/20; H04L 12/2803; H04L 12/10; H04L 12/2816; H04L 2012/2841; G06F 21/6218; G06F 21/00; G06F 21/85; G08C 2201/91; G08C 2201/20; H04B 2203/5433; H04B 5/0043; H04K 1/00; H04W 12/04; H04W 12/06
USPC ........ 726/22, 3, 1, 27, 2; 713/100, 1; 455/411
See application file for complete search history.

(56) References Cited

U.S. PATENT DOCUMENTS

| 8,165,526 | B2 | 4/2012 | Lee et al. | |
| 2004/0203592 | A1\* | 10/2004 | Kermode et al. | 455/411 |
| 2009/0111380 | A1\* | 4/2009 | Lee et al. | 455/41.3 |
| 2012/0131324 | A1\* | 5/2012 | Ansari et al. | 713/100 |

\* cited by examiner

*Primary Examiner* — Brian F Shaw
(74) *Attorney, Agent, or Firm* — GE Global Patent Operation; Marc A. Vivenzio

(57) ABSTRACT

An energy management system comprises one or more appliances, a remote device, and a communication device. In one embodiment, the communication device forms a physical connection with the remote device and thereafter a physical connection with an associated appliances. The first physical connection binds the communication to the remote device, thereby forming a secure connection over which inputs and outputs can be exchanged between the remote and the associated appliance when the communication device is connected to the appliance.

7 Claims, 4 Drawing Sheets

DEVICE AND METHOD FOR ENERGY MANAGEMENT IN A HOUSEHOLD

BACKGROUND

1. Technical Field

The subject matter of the present disclosure relates to energy management and energy management systems for a household and, more particularly, to devices and methods to connect an appliance to a remote device in an energy management system.

2. Description of Related Art

Home owners and other consumers of electrical power desire efficient energy management systems that can help reduce costs and peak demand to provide more efficient energy use. Various measures have been developed to address energy management goals. For example, energy efficient devices and appliances enable consumers to reduce energy consumption. In addition, utilities provide some consumers with direct control for certain electrical loads, such as heating or cooling devices, pool pumps, and so on, to allow utilities to control energy and power usage. Also, some utilities implement demand response programs for residential as well as industrial consumers in order to provide reduced peak demand requirements and to effectively manage energy consumption. While these and other developments are available and enable consumers to manage power consumption, intelligent systems that monitor and manage consumption and effectively communicate information to the consumer are still being developed.

BRIEF DESCRIPTION OF THE INVENTION

The present disclosure describes various embodiments of devices, systems, and methods that facilitate secure wireless data communication between appliances and a remote device. These embodiments utilize a communication device, which has a connector that physically engages a port on the appliances and the remote device. When coupled to the remote device, the communication device exchanges information that forms a secure connection between the communication device and the remote device. Thereafter the communication device can be coupled with the appliance to facilitate secure communication between the appliance and the remote device via the secure connection.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Broadly stated, the subject matter of the present disclosure provides secure wireless communication between a household appliance and a remote device without the need for an end user to enter security keys and other authentication codes. In one example, a communication device (e.g., a wireless radio) is authenticated through a physical connection with the remote device prior to use on the appliance. Data exchanged via this physical connection securely binds the communication device to the remote device so that when the communication device engages the household appliance, the household appliance and the remote device can exchange inputs and outputs including inputs and outputs that relate to performance of the household appliance.

Figure 1:
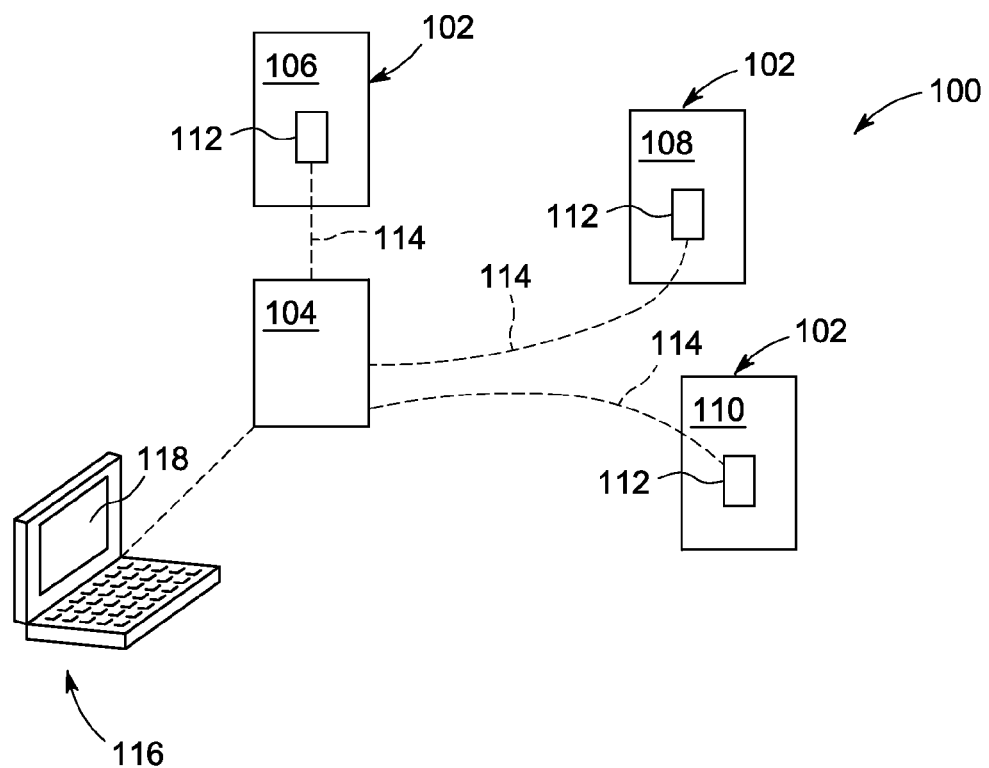
FIG. 1 depicts a schematic diagram of an example of an energy management system.

Referring now to the figures, FIG. 1 illustrates an embodiment of an energy management ("EM") system 100 for a home. The EM system 100 comprises one or more appliances 102 and a remote device 104. The appliances 102 may comprise a refrigerator 106, a dishwasher 108, and a washing machine 110. The system 100 also comprises a communication device 112 coupled to each of the appliances 102. Each of the communication devices 112 communicates via a secure connection 114 with the remote device 104. The EM system 100 may also include a computing device 116 (e.g., a personal computer) with a display 118. An end user can communicate with and/or configure the remote device 104 (and/or the appliances 102) with a user interface (not shown) and/or user input devices associated with the computing device 116.

The EM system 100 monitors operation of one or more of the appliances 102. Components of the EM system 100 gather operating data respecting power usage, on/off times, and other operating parameters that can help to evaluate and manage energy consumption through the household. The remote device 104 acts as a hub for integration of the appliances 102 and other components into the EM system 100. The remote device 104 communicates with the appliances 102, via wired and/or wireless communication protocols. These protocols permit the exchange of operating data and, in some examples, other inputs and outputs that can change the operation of the appliances 102.

The secure connection 114 permits secure exchange of the inputs and outputs. This feature prevents cross-talk between the appliances 102 as well as between appliances and devices found adjacent the EM system 100. For example, without the security of the secure connection 114, devices (e.g., the remote device 104) in a first household may intercept signals that originate from appliances (e.g., the appliances 102) in a second household.

In one embodiment, each of the communication devices 112 transmits and receives inputs and outputs between the appliances 102 it is associated with and the remote device 104. The exchange can occur over a wireless connection in accordance with one or more wireless protocols. Wireless protocols comprise, for example, Bluetooth®, 802.11, RF, and ZigBee. Embodiments of the communication device 112 are also compatible with any variety of signals such as radio frequency (RF) signals, infrared (IR) signals, and the like.

Each of the communication devices 112 can also comprise a connector, e.g., a universal serial bus (USB) connector and/or Ethernet jack. In one example, each of the appliances 102 and the remote device 104 comprises at least one of a USB port and an Ethernet port. In such an embodiment, the connector engages the port to create a physical connection that permits the exchange of inputs and outputs to and from the communication device 112 and the corresponding device (e.g., the associated appliance 102, the remote device 104, and the computer device 116). For example, when connected to the remote device 104, the communication device 112 exchanges security data (e.g., security keys and binding information) with the remote device 104. This exchange "securely binds" the communication device 112 to the remote device 104, thereby creating the secure connection 114. In one embodiment, the security data includes numeric and/or alphanumeric codes that can associate the two physically connected devices together. These codes may be established by one or more security/encryption protocols including, for example, the Wired Equivalent Privacy (WEP) broken security algorithm for IEEE 802.11. Protocols such as the WEP-protocol are known in the art, and thus additional details are not required herein.

The computing device 116 can provide a graphical user interface (GUI) or other display by which an end user can interface with the appliances 102 and the remote device 104, as well as other parts of the EM system 100. An end user can, in one example, utilize the computing device 116 to display information and operating data about the appliances 102. In one embodiment, the communication device 112 can engage a port (e.g., a USB port) on the computing device 116. With the communication device 112 in place, the computing device 116 can form the physical connection that binds the communication device 112 to the remote device 104 as set forth above. In one example, the remote device 104 exchanges security data with the communication device 112 through a cable or wire that connects the computing device 116 to the remote device 104.

Figure 2:
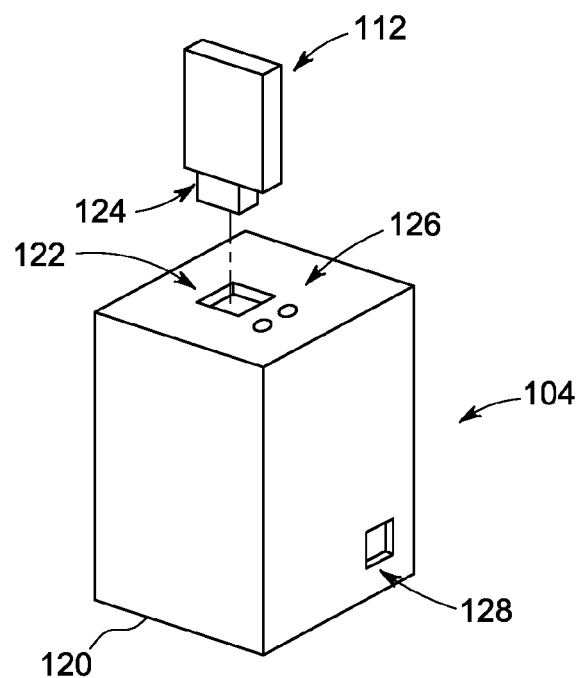
FIG. 2 depicts a perspective view of an example of a remote device for use in the energy management system of FIG. 1.
Figure 3:
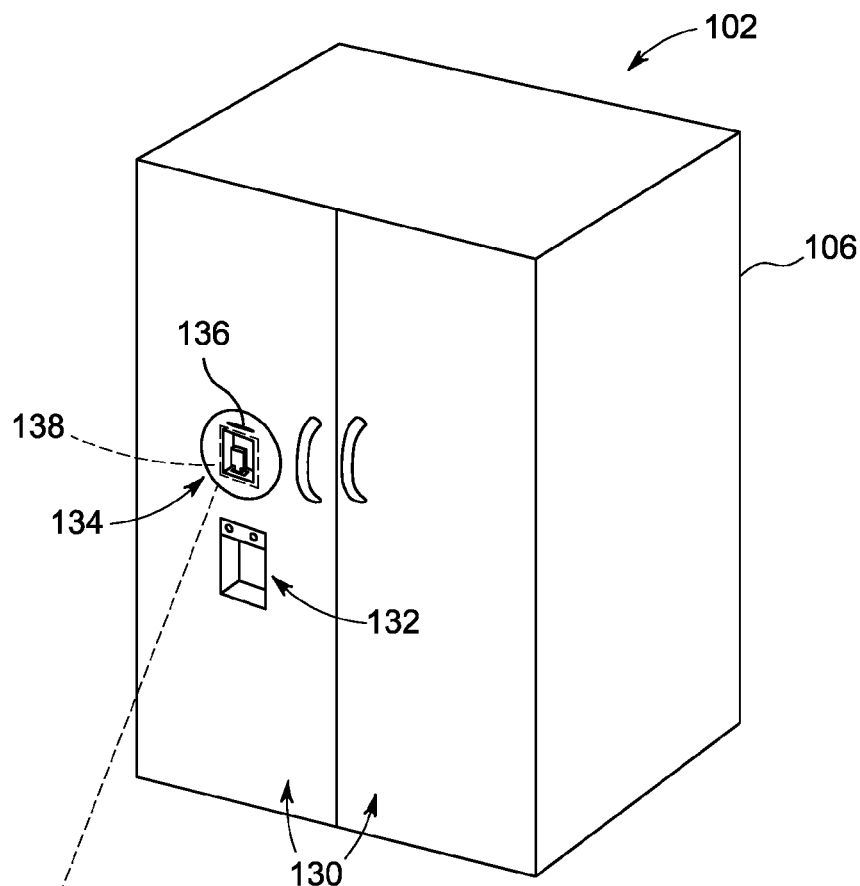
FIG. 3 depicts a perspective view of an example of an appliance for use in the energy management system of FIG. 1.
Figure 4:
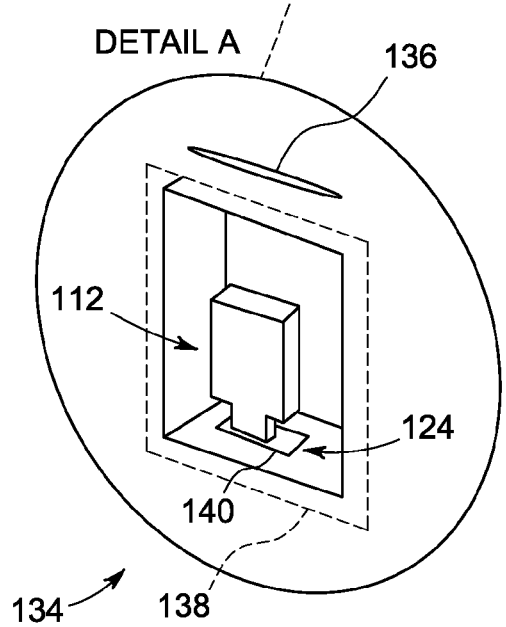
FIG. 4 depicts a detail view of the appliance of FIG. 3.

FIGS. 2, 3, and 4 illustrate details of the appliance 102, the remote device 104, and the communication device 112. The remote device 104 is so called because it is separated from the appliance 102. In FIG. 2, the remote device 104 has a body 120 that houses various components such as processors, memory, and ancillary elements that facilitate functions of the remote device 104. The remote device 104 has a first port 122 (or "first socket 122") that can interface with a connector 124 on the communication device 112. The remote device 104 also comprises one or more indicators 126 (e.g., LEDs) and a peripheral jack 128.

The remote device 104 can couple with an electrical outlet to provide power to the components of the remote device 104. In other examples, the peripheral jack 128 can accommodate a cable that couples the remote device 104 to the electrical outlet to provide power. In addition to power ready devices, the peripheral jack 128 can comprise other devices (e.g., Ethernet, USB, etc.) that can both provide power to the remote device 104 as well as to permit exchange of inputs and outputs between the remote device 104 and a peripheral device (e.g., the computing device 116 of FIG. 1).

The body 120 of the remote device 104 can have any shape and/or size, although in many cases the shape is aesthetically pleasing. For example, the remote device 104 may be visible in various areas of the home, e.g., a kitchen. Thus the body 120 may have contours, colors, and other features that fit within the decor or utility of the particular area of the home. The indicators 126 can incorporate single color devices (e.g., red, green, yellow, etc.) or a combination of colors and features. These devices are useful to provide visual indications to an end user about the condition of the remote device 104. In one example, the indicators 126 activate when the communication device 112 couples with the first port 122. The indicators 126 can also activate when the remote device 104 communicates with the communication device 112. In still other examples, the indicators 126 activate in response to other functions of the remote device 104 (e.g., communication with the appliances 102 (FIG. 1) and the computing device 116 (FIG. 1)).

Examples of the communication device 112 are portable for easy transfer to and from the remote device 104 and to and from the appliances 102. Exemplary forms for the communication device 112 can embody keyfobs and like-sized medallions or devices that provide suitable functions (e.g., storage of security information and data) in packaging of reduced size and shape. The first port 122 can comprise a suitable outlet to receive the connector 124 therein. As the disclosure describes above, the outlet can include USB-type connectors, although the first port 122 can also incorporate other connector types that are compatible with the connector 124 of the communication device 112. Examples of other connectors include Ethernet and RS-232 styles.

FIG. 3 depicts the appliance 102 in the form of the refrigerator 106 with a pair of doors 130 and a dispensing device 132 disposed therein. Above the dispensing device 132, the refrigerator 106 comprises a hatch 134, an indicator 136, and a hatch door 138 (shown in phantom line) that encloses the hatch 134 with the communication device disposed therein. In FIG. 4, details of the hatch 134 (with hatch cover 138 in phantom lines) show that the hatch 132 includes a second port 140 (or "second socket 140") that couples with the connector 124 on the communication device 112.

Design considerations (e.g., size, position, configurations) for the hatch 134 can vary according to, e.g., the type of appliance 102. For example, differences in the various appliances may introduce design considerations that require unique placement of the hatch 134. Although shown in the present example on the front face of the refrigerator 106, examples of the appliance 102 are likewise amenable to positions on one or more the adjacent side faces, the top face, and back face. Other examples of the appliance 102 may have any variety of different configurations of the hatch 134 that makes the communication device 112 and the port 140 accessible to the end user.

In the present example, the hatch door 138 may be removably replaceable from the opening of the hatch 136 to provide access to the interior. The hatch door 138 may be wholly removed or hinged. Likewise other examples of the hatch door 138 may include slidable features that actuate across the opening of the hatch 134 to provide access therein. In other embodiments, the hatch 134 or other opening may be unnecessary in lieu of a wire or other peripheral element that couples the communication device 112 to the appliance 102.

As described in connection with the remote device 104 above, the indicator 136 provides visual indication of the status of the appliance 102. LEDs and similar lighting devices can be used to provide such visual indication. These components may be accompanied by audible cues and signals, provided by suitably configured devices (not shown in the present examples). The visual indication can identify operating conditions of the appliance 106. For example, the indicator 136 may provide a first visual indication (e.g., flash) when the communication device 112 engages the second port 140. The indicator 136 may likewise provide a second visual indication (e.g., steady illumination) when the appliance 106 establishes communication with the remote device. In still another example, the indicator 136 may not be activated (or energized) when the communication device 112 is not present in the second port 140.

Figure 5:
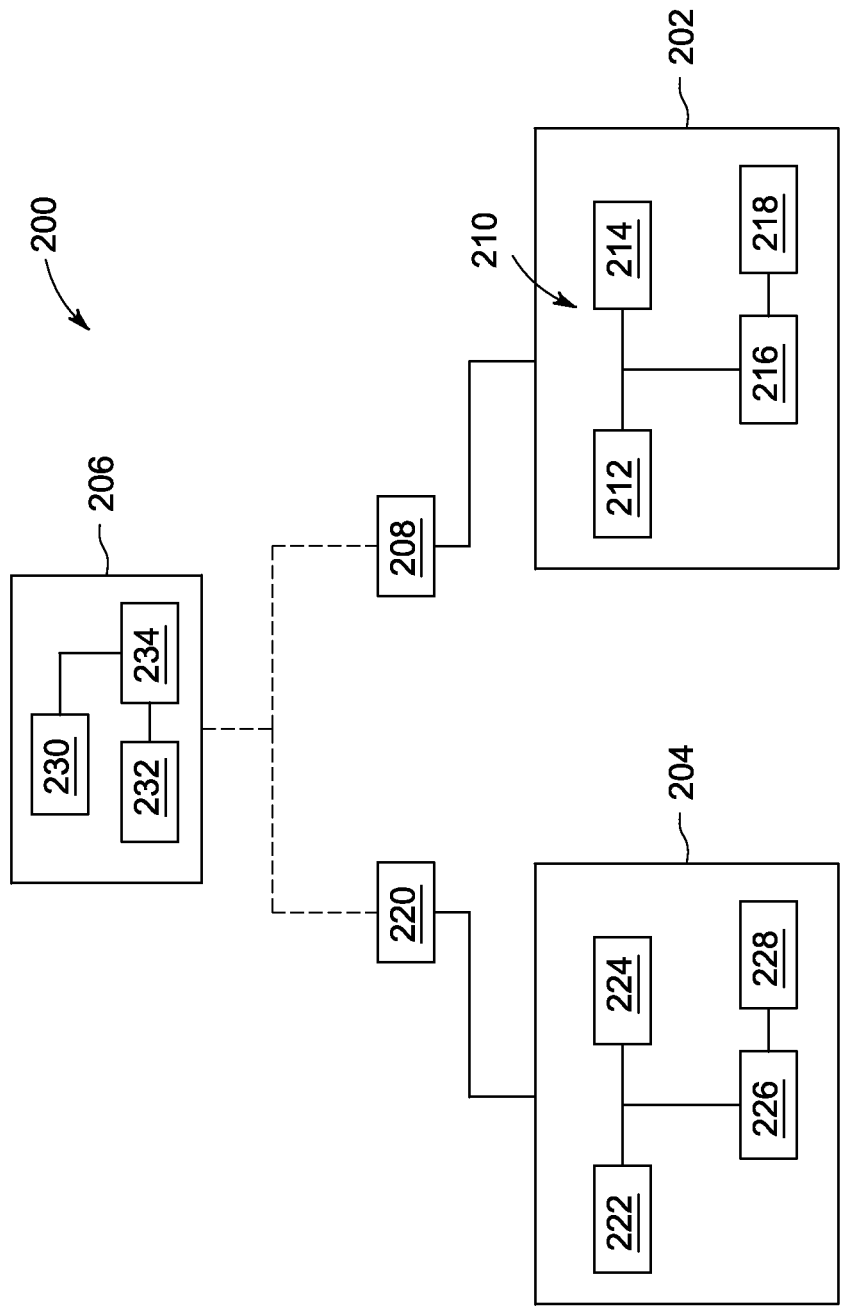
FIG. 5 depicts a high-level wiring schematic of circuitry for use in one or more of the remote device and the appliance of, respectively, FIG. 2 and FIGS. 3 and 4.

FIG. 5 depicts a high-level wiring schematic of an example of a system 200 that monitors operation of appliances. This exemplary circuitry couples a communication device (e.g., the communication device 112 of FIGS. 1, 2, 3, and 4) with an appliance (e.g., the appliances 102 of FIGS. 1, 3, and 4) and/or a remote device (e.g., the remote device 104 of FIGS. 1 and 2). Generally a variety of configurations can be used to implement the concepts of the present disclosure. The example of FIG. 5 provides a schematic diagram of one system 200, which comprises an appliance 202, a remote device 204, and a communication device 206. The appliance 202 comprises a port 208 and an appliance control circuit 210 with a processor 212, memory 214, and sensing circuitry 216, and a sensor 218 for, e.g., measuring power usage of the appliance 202. The remote device 204 comprises a port 220, a processor 222, memory 224, and control circuitry 226. In the present example, the remote device 204 comprises an indicator 228 such as one or more LEDs (not shown). The communication device 206 comprises a radio 230, a memory 232, and a power source 234, which can be a rechargeable power source to maintain operation of the communication device 206 during transit between the remote device 204 and the appliance 202.

Memory 214, 224 and 232 can store data that comprises security keys in the form of information, e.g., IDs, serial numbers, IP addresses, WEP addresses, etc. In one embodiment, this information identifies the remote device 204 and the communication device 206. The security keys may include a first security key (e.g., on memory 224) and a second security key (e.g., on memory 232). In one example, engaging the communication device 206 with the port 220 causes the remote device 204 to transmit the first security key to the communication device 206. In response to the first security key, the communication device 206 transmits the second security key to the remote device 204. The combination of the first security key and the second security key establishes the secure connection (e.g., the secure connection 114 of FIG. 1) between the remote device 204 and the communication device 206.

Thereafter, the communication device 206 can engage the port 208, thereby permitting the exchange of inputs and outputs between the appliance 202 and the remote device 204 over the secure connection. In one embodiment, the appliance control circuit 210 is configured to sense the physical connection of the communication device 212 with the port 208. Sensing may include the exchange of inputs and outputs. In one example, the appliance control circuit 210 can sense a change in voltage (or current or other similarly identifiable change) that occurs in response to the physical connection. The change in voltage may, for example, indicate that the communication device 206 draws power from the appliance 202.

The security keys may be stored in advance in the memory (e.g., the memory 224 and the memory 232) so that the remote device 204 can identify the communication device 206 when the communication device 206 engages the port 220. In one embodiment, the memory 224 may include executable instructions (e.g., hardware and software) that, when executed by the processor, can establish a protocol for wireless communication with the communication device 206. This protocol may use the security keys, as set forth above. This protocol can bind the communication device 206 to the remote device 204, forming the secure connection, and thereby securing the exchange of inputs and outputs between the communication device 206 and the appliance 202.

In one example, the processors (e.g., the processors 212, 222) are a central processing unit (CPU) such as an ASIC and/or an FPGA. The processors can also include state machine circuitry or other suitable components capable of receiving inputs and generating outputs. The memory (e.g., the memory 214, 224, 232) includes volatile and nonvolatile memory and can be used for storage of software (or firmware) instructions and configuration settings. In some embodiments, the processors, the memory, and other circuitry can be contained in a single integrated circuit (IC) or other component. As another example, the processors can include internal program memory such as RAM and/or ROM. Similarly, any one or more of functions of these components can be distributed across additional components (e.g., multiple processors or other components). Artisans with skill in the relevant appliance arts will recognize suitable configurations of circuitry, therefore it is not necessary that this disclosure provides a detailed discussion herein. Production and manufacture process may include processes to write information (e.g., the security keys) onto the memory. In other examples, executable instructions (e.g., software and firmware) that operate the appliance 202, the remote device 204, and/or the communication device 206 may include the security keys coded therein. Installation of these instructions may write the security keys to the memory during installation as well as during data upgrades that can occur through a compatible computing device (e.g., a laptop) or through communication with the remote device 204 and/or the appliance 202.

Figure 6:
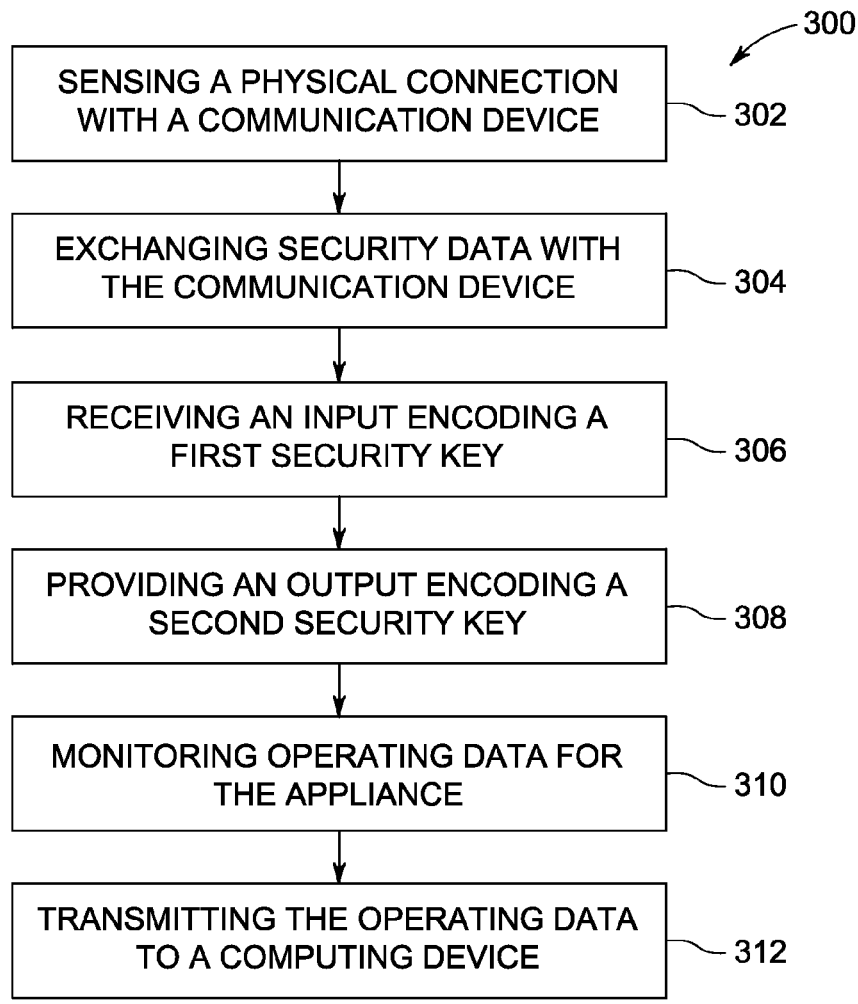
FIG. 6 depicts a flow diagram of an exemplary method of connecting an appliance and a remote device.
Figure 7:
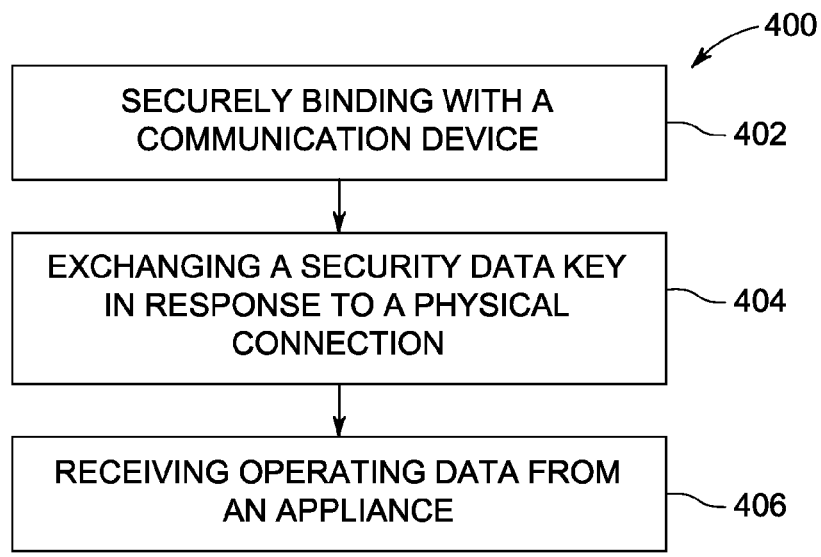
FIG. 7 depicts a flow diagram of another exemplary method of connecting an appliance and a remote device.

FIGS. 6 and 7 illustrate examples of a method 300 (FIG. 6) and a method 400 (FIG. 7) for monitoring an appliance (e.g., the appliances 102, 202 of FIGS. 1, 2, 3, 4, and 5) with a communication device (e.g., the communication device 112, 206 of FIGS. 1, 2, 3, 4, and 5).

The method 300 of FIG. 6 includes, at block 302, sensing a physical connection with a communication device. The method 300 also includes, at block 304, exchanging security data with the communication device. The method 300 further comprises, at block 306, receiving an input encoding a first security key from the communication device and, at block 308, providing an output encoding a second security key. The method 300 also comprises, at block 310, monitoring operating data for the appliance and, at block 312, transmitting the operating data to a computing device. In FIG. 7, the method 400 includes, at block 402, securely binding with a communication device and, at block 404, exchanging a security data key with the communication device in response to the physical connection. The method 400 also comprise, at block 406, receiving operating data from an appliance.

The steps of the methods 300, 400 can embody executable instructions that are stored on memory and configured to be executed by a processor. For example, the executable instructions may reside in memory of the remote device, thereby enabling the remote device to interface with the communication device as disclosed above. Embodiments of the methods 300, 400 may likewise operate as part of programs (e.g., a software program) that the memory of the remote device stores. Such programs can be implemented in response to execution of certain operating steps such as, for example, the physical connection of the communication device with the remote device.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for establishing communication between an appliance and a remote device configured to monitor operation of the appliance, each of the appliance and the remote device comprising a processor, a memory, a wireless radio, and a port, said method comprising:

connecting a communication device to the port on the remote device to form a first physical connection between the communication device and the remote device;

exchanging security data via the first physical connection to securely bind the communication device with the remote device to form a secure connection for wireless communication between the communication device and the remote device, the security data including a first security key stored on the memory of the remote device and a second security key stored in the memory of the communication device, wherein the remote device is configured to transmit the first security key to the communication device and the communication device is configured to transmit the second security key to the remote device in response to the first security key from the remote device, and wherein the first security key stored on the memory of the remote device and the second security key stored on the memory of the communication device comprise a serial number, an Internet Protocol address, and a code established by one or more security protocols that associate the remote device with the communication device when physically connected together; and connecting the communication device to the port on the appliance to form a second physical connection that enables the remote device to exchange operating data with the appliance using the communication device and the secure connection for wireless communication between the communication device and the remote device, wherein disconnecting the second physical connection disallows the appliance and the remote device from communicating using the secure connection for wireless communication between the communication device and the remote device, and wherein the exchange of operating data requires the communication device and the remote device to engage to form the first physical connection prior to the appliance physically connecting with the communication device to engage to form the second physical connection.

2. The method of claim 1, wherein the first appliance and the second appliance having different communication devices connected thereto.

3. A system for home energy management, comprising:

an appliance, a remote device, and a communication device that is configured to permit wireless communication between the appliance and the remote device when the communication device is engaged with the appliance;

wherein the remote device comprises:
- a processor, a memory coupled to the processor, and one or more executable instructions stored on the memory and configured to be executed by the processor, the one or more executable instructions comprising instructions for:
  - sensing a first physical connection with the communication device; and
  - exchanging security data with the communication device in response to and over the first physical connection to form a secure connection for wireless communication between the communication device and the remote device;

wherein the appliance comprises:
- a port configured to engage with the communication device to form a second physical connection; and
- a control circuit coupled to the port, wherein the control circuit is configured to sense the second physical connection of the communication device to the port on the appliance and, in response to the second physical connection, permit the appliance to exchange operating data with the remote device using the communication device and the secure connection for wireless communication between the communication device and the remote device, wherein the exchange of operating data requires the communication device and the remote device to engage to form the first physical connection prior to the appliance physically connecting with the communication device to engage to form the second physical connection, wherein the remote device is configured to transmit the first security key to the communication device and the communication device is configured to transmit the second security key to the remote device in response to the first security key, wherein first security key and the second security key are stored in memory of each respective device, and wherein the first security key and the second security key comprise a serial number, an Internet Protocol address, and a code established by one or more security protocols that associate the remote device with the communication device when physically connected together.

4. The system of claim 3, wherein the remote device further comprising instructions for receiving the operating data from the appliance over the secure connection.

5. The system of claim 3, wherein the remote device further comprising a port configured to receive a connector on the communication device to form the first physical connection.

6. The system of claim 5, wherein the connector is coupled to a wire that is connected to a computing device.

7. The system of claim 3, wherein the remote device further comprising instructions for:
- monitoring the operating data; and
- transmitting, the operating data to a computing device.

* * * * *